(12) United States Patent
Hsu et al.

(10) Patent No.: US 9,348,133 B2
(45) Date of Patent: May 24, 2016

(54) IMAGE PROJECTION METHOD AND MEMS IMAGE PROJECTION APPARATUS

(71) Applicant: LITE-ON IT CORPORATION, Taipei (TW)

(72) Inventors: Chia-Hao Hsu, Hsinchu (TW); Chun-Lai Hsiao, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 632 days.

(21) Appl. No.: 13/746,327

(22) Filed: Jan. 22, 2013

(65) Prior Publication Data

US 2014/0153073 A1    Jun. 5, 2014

(30) Foreign Application Priority Data

Nov. 30, 2012    (CN) .......................... 2012 1 0505269

(51) Int. Cl.
*G02B 26/08*    (2006.01)
*G02B 26/10*    (2006.01)

(52) U.S. Cl.
CPC ............ *G02B 26/0833* (2013.01); *G02B 26/10* (2013.01)

(58) Field of Classification Search
CPC ............... G02B 26/08; G02B 26/0816; G02B 26/0825; G02B 26/0833; G02B 26/0841; G02B 26/085; G02B 26/0858; G02B 26/0866
See application file for complete search history.

(56) References Cited

U.S. PATENT DOCUMENTS 7,126,733 B2 *  10/2006  Kandori et al. ............ 359/196.1

* cited by examiner

*Primary Examiner* — Ricky Mack
*Assistant Examiner* — Robert E Tallman
(74) *Attorney, Agent, or Firm* — Jianq Chyun IP Office (57) ABSTRACT

An image projection method and a microelectromechanical system (MEMS) image projection apparatus are provided. The image projection method controls a MEMS scanning mirror swinging around a first swing axis to project an image light beam. The image projection method includes following steps. A resonance frequency and a damping coefficient of the MEMS scanning mirror at swinging are measured to calculate a first amplitude scale and a first maintaining period, and a periodic wave signal is generated accordingly. The periodic wave signal is output to the MEMS scanning mirror for controlling the MEMS scanning mirror to swing, and a swing speed error thereof is recorded. By adjusting the first amplitude scale and the first maintaining period, the periodic wave signal is also adjusted, and the corresponding swing speed error is recorded. According to the recorded swing speed errors, the corrected periodic wave signal is generated for controlling the MEMS scanning mirror.

15 Claims, 6 Drawing Sheets

IMAGE PROJECTION METHOD AND MEMS IMAGE PROJECTION APPARATUS

CROSS-REFERENCE TO RELATED APPLICATION

This application claims the priority benefit of China application serial no. 201210505269.6, filed on Nov. 30, 2012. The entirety of the above-mentioned patent application is hereby incorporated by reference herein and made a part of this specification.

BACKGROUND

1. Technical Field

The invention relates to an image projection method and an image projection apparatus. Particularly, the invention relates to an image projection method using a microelectromechanical system (MEMS) scanning mirror and a MEMS image projection apparatus.

2. Related Art

A microelectromechanical system (MEMS) generally refers to a research field that a microelectronics technique and a mechanical engineering technique are used to fabricate or develop related electronic components and mechanical structures, so as to miniaturize related products. Since a laser projection apparatus using a MEMS scanning mirror has effects of small size and low power consumption, etc., it is commonly used in smart phones or notebook computers, and becomes an indispensable part of portable audio and video apparatuses.

Generally, the MEMS scanning mirror is used to project an image light beam on a projection plane to provide an image. By controlling the MEMS scanning mirror to swing around different swing axes, the image light beam can scan back and forth on the projection plane along a corresponding direction. For example, if a scan frequency of the image light beam along a vertical direction of the projection plane is 60 Hz, when the MEMS scanning mirror swings around the corresponding swing axis, a swing frequency thereof is 60 Hz, and a control signal used for controlling the MEMS scanning mirror is generally a periodic wave signal which is 60 Hz, so as to present a required image quality.

However, the MEMS mirror itself also has a resonance frequency. Therefore, when the periodic wave signal is input to control the MEMS scanning mirror, the MEMS scanning mirror reacts with a harmonic component having the resonance frequency thereof in the periodic wave signal, and the image light beam may cause a problem of bright line on a projected image due to uneven swing speed of the MEMS scanning mirror during scanning. Therefore, it is an important issue concerned by related technicians to resolve the problem of bright line to provide better projection quality.

SUMMARY

The invention is directed to an image projection method, by which a resonance frequency and a damping coefficient of a microelectromechanical system (MEMS) scanning mirror at a swing motion are used to generate and provide a periodic wave signal to control the MEMS scanning mirror, so as to provide better image quality.

The invention is directed to a MEMS image projection apparatus, in which a detection unit and a control unit are used to provide a periodic wave signal to control a MEMS scanning mirror to provide better image quality according to the aforementioned image projection method.

An embodiment of the invention provides an image projection method, which controls a MEMS scanning mirror to swing around a first swing axis in order to project an image light beam on a projection plane along a first direction. The image projection method includes following steps. A resonance frequency and a damping coefficient of the MEMS scanning mirror swinging around the first swing axis are measured. A first amplitude scale and a first maintaining period are calculated according to the resonance frequency and the damping coefficient. A periodic wave signal is generated, where each time when a level of the periodic wave signal rises to the first amplitude scale, during the first maintaining period, the level of the periodic wave signal is maintained at the first amplitude scale. The periodic wave signal is input to the MEMS scanning mirror to control the MEMS scanning mirror to swing, and a swing speed error of the MEMS scanning mirror is recorded. The periodic wave signal is adjusted by adjusting the first amplitude scale and the first maintaining period, and the corresponding swing speed error is recorded. According to the recorded swing speed error, a corrected periodic wave signal is generated to control the MEMS scanning mirror to swing.

In an embodiment of the invention, the first maintaining period is a half of a reciprocal of the resonance frequency.

In an embodiment of the invention, in a method of calculating the first amplitude scale according to the damping coefficient, a following equation is used:

$$\alpha = \frac{1}{1 + e^{\frac{-\pi\zeta}{\sqrt{1-\zeta^2}}}}$$

Where, $\alpha$ is a first ratio coefficient, $\zeta$ is a damping coefficient, and the first amplitude scale is a multiplication of the first ratio coefficient and an amplitude of the periodic wave signal.

In an embodiment of the invention, the periodic wave signal is a triangular wave signal, where a time for a level of the triangular wave signal rising from a trough to a peak is less than a time for the level of the triangular wave signal falling from the peak to the trough.

In an embodiment of the invention, the step of recording the swing speed error of the MEMS scanning mirror includes following steps. A swing position variation of the MEMS scanning mirror is recorded, a differential curve of the swing position variation is calculated, and the swing speed error of the MEMS scanning mirror is calculated according to a segment of the differential curve corresponding to a level falling segment of the periodic wave signal.

In an embodiment of the invention, the step of generating the corrected periodic wave signal according to the recorded swing speed error include following steps. The first amplitude scale and the first maintaining period are calculated according to a quadratic approximation method when the swing speed error is the minimum. The corrected periodic wave signal is generated according to the corresponding first amplitude scale and the first maintaining period.

In an embodiment of the invention, the step of generating the periodic wave signal includes performing a filtering processing to the periodic wave signal to filter noise.

In an embodiment of the invention, the MEMS scanning mirror further swings around a second swing axis, and the MEMS scanning mirror projects the image light beam on the projection plane along a second direction.

An embodiment of the invention provides a MEMS image projection apparatus, which applies an image projection method to project an image light beam on a projection plane along a first direction. The MEMS image projection apparatus includes a MEMS scanning mirror, a detection unit, a periodic wave signal generator and a control unit. The MEMS scanning mirror has a resonance frequency and a damping coefficient when swinging around a first swing axis. The detection unit detects a swing position variation of the MEMS scanning mirror. The periodic wave signal generator is coupled to the MEMS scanning mirror, and the periodic wave signal generator outputs a periodic wave signal having a first frequency to the MEMS scanning mirror according to a first amplitude scale and a first maintaining period, so as to control the MEMS scanning mirror to swing around the first swing axis according to the first frequency, and accordingly project an image light beam on the projection plane along the first direction. The control unit is coupled to the periodic wave signal generator and the detection unit. The control unit calculates the first amplitude scale and the first maintaining period according to the resonance frequency and the damping coefficient, and controls the periodic wave signal generator to output the periodic wave signal. The control unit calculates a swing speed error of the MEMS scanning mirror according to the swing position variation of the MEMS scanning mirror. Moreover, the control unit adjusts the first amplitude scale and the first maintaining period and records the corresponding swing speed error. The control unit controls the periodic wave signal generator to output a corrected periodic wave signal according to the recorded swing speed error, so as to control the MEMS scanning mirror to swing.

According to the above descriptions, in the image projection method of the invention, by measuring the resonance frequency and the damping coefficient of the MEMS scanning mirror at swinging, the first amplitude scale and the first maintaining period are calculated to generate the periodic wave signal. While the periodic wave signal is input to control the MEMS scanning mirror, a swing speed error of the MEMS scanning mirror is detected. In the image projection method, the periodic wave signal is adjusted by adjusting the first amplitude scale and the first maintaining period, and the corresponding swing speed error is recorded. Moreover, the corrected periodic wave signal is generated according to the recorded swing speed error, the input first amplitude scale and the input first maintaining period. The corrected periodic wave signal is used to control the MEMS scanning mirror to swing around the first swing axis, and the image light beam can be smoothly and evenly projected on the projection plane along the first direction, so as to obtain better image quality. The MEMS image projection apparatus of the invention applies the aforementioned image projection method to achieve better image quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
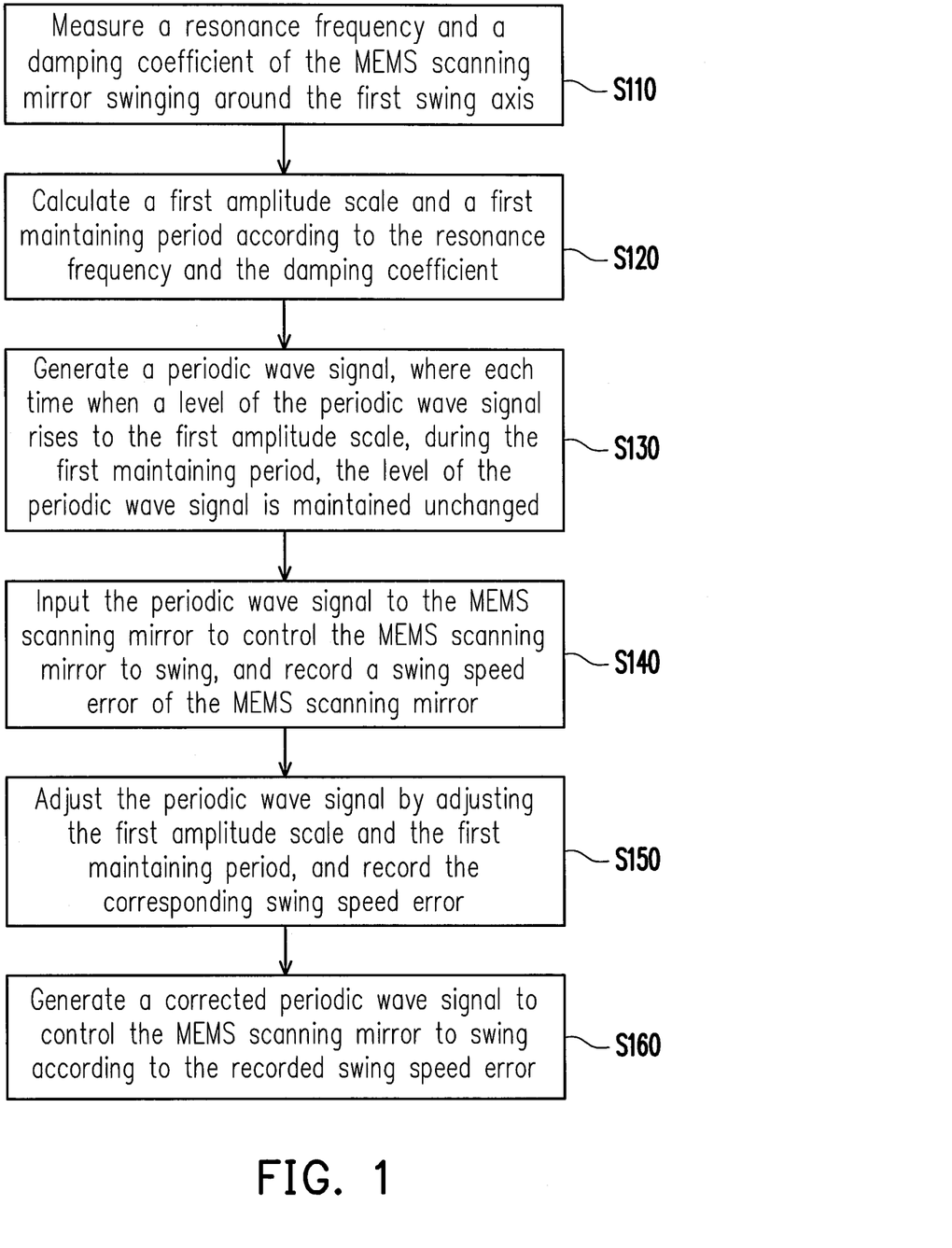
FIG. 1 is a flowchart illustrating an image projection method according to an embodiment of the invention.

An image projection method provided by an embodiment of the invention is mainly used to control a microelectromechanical system (MEMS) scanning mirror swinging around a first swing axis in order to project an image light beam on a projection plane along a first direction. FIG. 1 is a flowchart illustrating the image projection method according to an embodiment of the invention. Referring to FIG. 1, the image projection method includes following steps. In step S110, a resonance frequency and a damping coefficient of the MEMS scanning mirror swinging around the first swing axis are measured. In step S120, a first amplitude scale and a first maintaining period are calculated according to the resonance frequency and the damping coefficient. In step S130, a periodic wave signal is generated. Regarding a waveform of the periodic wave signal, each time when a level of the periodic wave signal rises to the first amplitude scale, during the first maintaining period, the level of the periodic wave signal is maintained unchanged (at the first amplitude scale). In step S140, the periodic wave signal is input to the MEMS scanning mirror to control the MEMS scanning mirror to swing, and a swing speed error of the MEMS scanning mirror is recorded. In step S150, the periodic wave signal is adjusted by adjusting the first amplitude scale and the first maintaining period, and the corresponding swing speed error is recorded. In step S160, according to the recorded swing speed error, a corrected periodic wave signal is generated to control the MEMS scanning mirror to swing. A detailed flow of the image projection method is described below.

Figure 2:
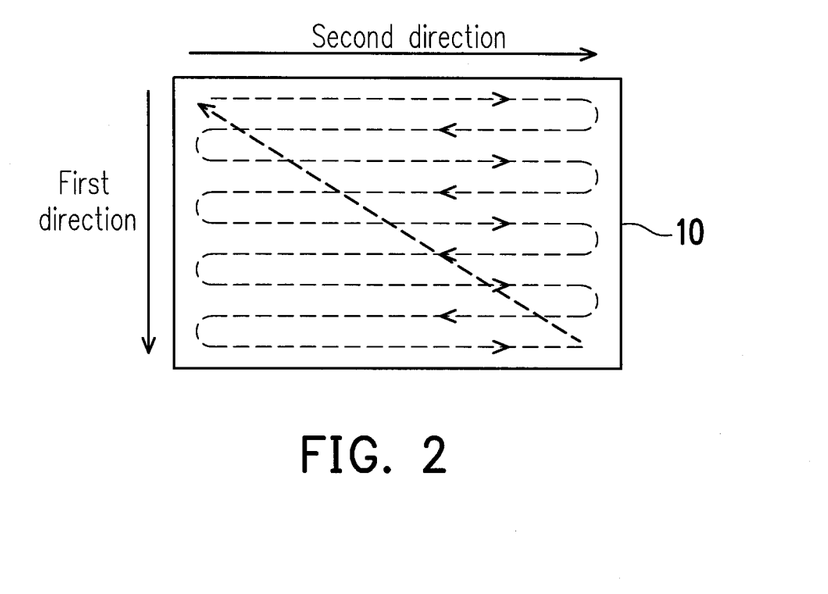
FIG. 2 is a projection schematic diagram of an image light beam according to an embodiment of the invention.

FIG. 2 is a projection schematic diagram of an image light beam according to an embodiment of the invention. Referring to FIG. 2, the image light beam is controlled by the MEMS scanning mirror (not shown) to progressively scan and move on a projection plane 10 according to a designed scanning trace, so as to integrally project an image on the projection plane. Generally, a swing direction of the MEMS scanning mirror corresponds to a projection direction of the image light beam on the projection plane 10. In the present embodiment, when the MEMS scanning mirror swings around the first swing axis, the image light beam correspondingly moves back and forth on the projection plane 10 along the first direction to implement projection. Further, when the MEMS scanning mirror swings around a second swing axis, the image light beam scans on the projection plane 10 along the second direction, so as to project the image light beam.

In the present embodiment, a scanning frequency of the image light beam along the second direction is higher than the scanning frequency of the same along the first direction. In view of the design, as long as a swing frequency (for example, 60 Hz) of the MEMS scanning mirror swinging around the first swing axis is designed to be lower than a swing frequency (for example, 18000 Hz) of the MEMS scanning mirror swinging around the second swing axis, the image light beam can form the scanning trace as that shown in FIG. 2. It should be noticed that scanning trace of the image light beam scanning the projection plane is not limited as that described above, and in other embodiments, different scanning traces are also applicable. A method for controlling the MEMS scanning mirror is to input a periodic wave signal with a specific frequency to the MEMS scanning mirror, and the MEMS scanning mirror swings back and forth around a specific swing axis according to the specific frequency, waveform and amplitude of the periodic wave signal, and accordingly the image light beam can scan on the projection plane 10 along a corresponding direction.

Figure 3:
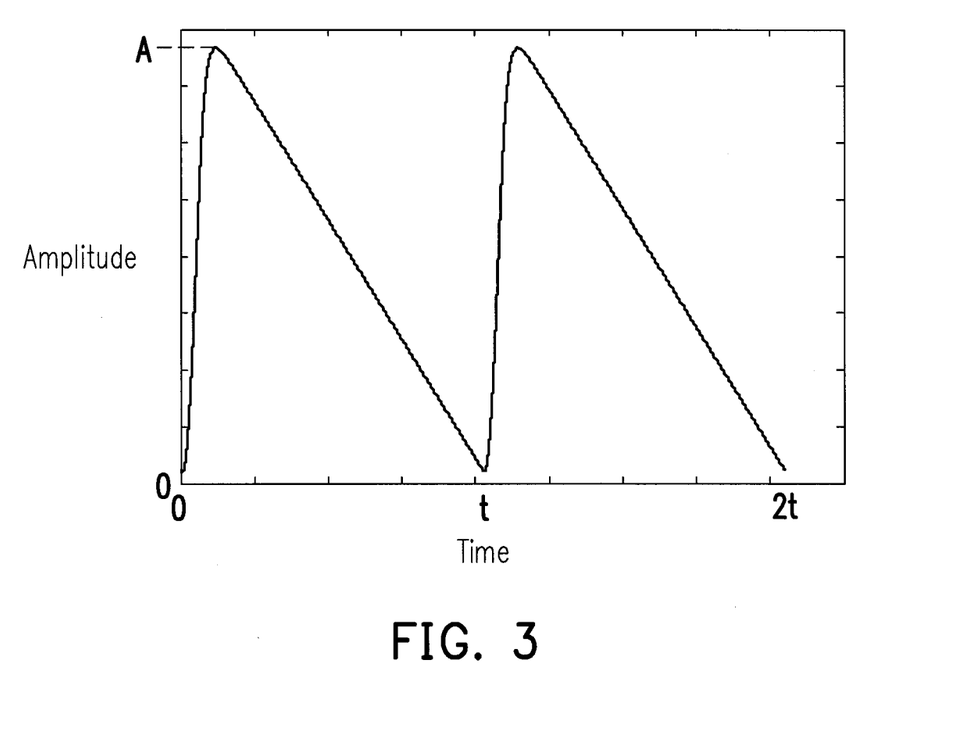
FIG. 3 is a schematic diagram of a periodic wave signal.

Referring to FIG. 2, as the periodic wave signal is used to control the MEMS scanning mirror to project the image light beam along the first direction, when the image light beam scans to one end along the first direction, the image light beam needs to quickly return to the other end of the projection plane 10, so as to scan the projection plane 10 from the beginning. Therefore, regarding the periodic wave signal used for controlling the MEMS scanning mirror to swing around the first swing axis, a time for a level of the periodic wave signal rising from a trough to a peak is different to a time for the level of the periodic wave signal falling from the peak to the trough. FIG. 3 is a schematic diagram of a periodic wave signal. Referring to FIG. 3, the periodic wave signal is a triangular wave signal, where a maximum amplitude thereof is A, a period thereof is t, and a time for a level thereof falling from the peak to the trough is different to a time for the level thereof rising from the trough to the peak, such that a swing speed of the MEMS scanning mirror swinging back and swinging forth around the first swing axis is different, and the image light beam can integrally scan the projection plane along the first direction, and quickly return from one end of the projection plane to another end, so as to scan the projection plane from the beginning.

A non-sinusoidal periodic wave is generally composed of a plurality of harmonic components. For example, in a 60 Hz triangular wave, besides a sinusoidal wave with a 60 Hz base frequency, the 60 Hz triangular wave further includes a plurality of harmonic components where frequencies of the harmonic components are multiples of 60 HZ, for example, harmonic components of 120 Hz, 180 Hz and 240 Hz. According to the above descriptions, when the 60 Hz triangular wave signal is served as the periodic wave signal to control the MEMS scanning mirror to swing around the first swing axis, since the MEMS scanning mirror itself also has a resonance frequency when the MEMS scanning mirror swings, the harmonic component in the periodic wave signal with the frequency close to the resonance frequency of the MEMS scanning mirror may result in a fact that a movement of the image light beam on the projection plane along the corresponding first direction is not as good as an expected smooth movement. Further, a vacillation phenomenon is occurred and a bright line is generated in a projected image.

The image projection method provided by the embodiment of the invention is capable of resolving the aforementioned problem. Although the MEMS scanning mirror reacts with the harmonic component having the resonance frequency in the periodic wave signal to oscillate, if two harmonic components with opposite phases are simultaneously input, the oscillation of the MEMS scanning mirror corresponding to the harmonic components with the opposite phases is counteracted, such that swing of the MEMS scanning mirror swinging around the first swing axis is relatively fluent.

According to the above concept, referring to FIG. 1, in the step S110, the resonance frequency and the damping coefficient of the MEMS scanning mirror swinging around the first swing axis are measured through system identification or other methods. For example, when measuring the resonance frequency of the MEMS scanning mirror, periodic wave signals of different frequencies can be respectively input, and the resonance frequency of the MEMS scanning mirror is determined according to maximum swing amplitude of the MEMS scanning mirror controlled by the different periodic wave signals.

Figure 4:
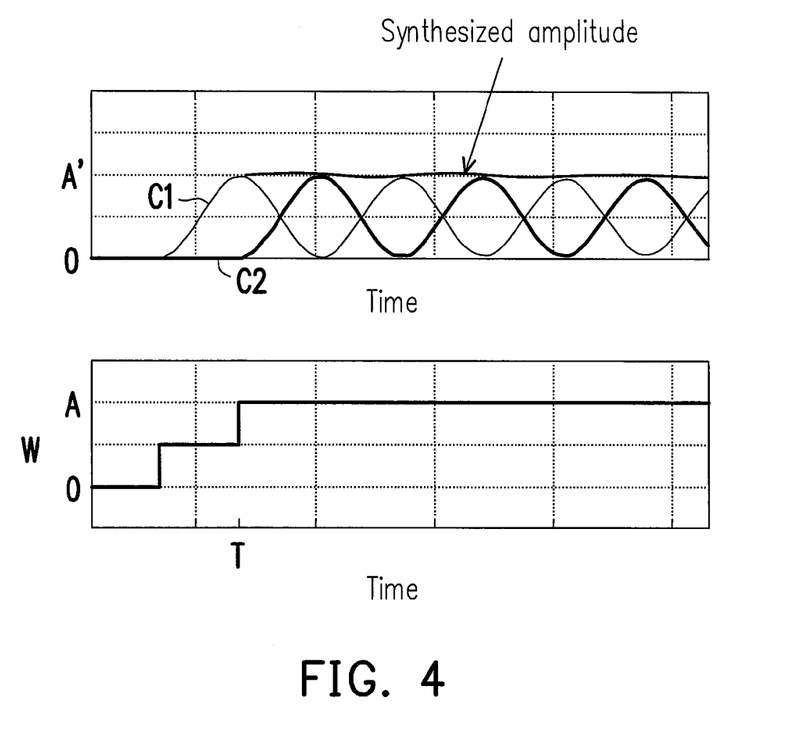
FIG. 4 is a principle schematic diagram of using a triangular wave signal which is two-stage rising.

In step S120, the first amplitude scale and the first maintaining period are calculated according to the resonance frequency and the damping coefficient, and the first amplitude scale and the first maintaining period are used to generate the periodic wave signal in the step S130. In the present embodiment, the periodic wave signal is a triangular wave signal, and a time for a level of the triangular wave signal rising from a trough to a peak is less than a time for the level of the triangular wave signal falling from the peak to the trough. In order to cancel the swing oscillation caused by the harmonic component having the resonance frequency in the triangular wave signal, the image projection method generates the triangular wave signal through two-stage rising manner. FIG. 4 is a principle schematic diagram of using a triangular wave signal which is two-stage rising. Referring to FIG. 4, if a level of a synthesized wave W rises to an amplitude A within a time T through the two-stage rising manner in a rising stage, when the synthesized wave W is used to drive the MEMS scanning mirror, in the first stage rising, the MEMS scanning mirror has a position signal component C1 of the first stage, and in the second stage rising, the MEMS scanning mirror has a position signal component C2 of the second stage, and the position signal components C1 and C2 of the two stages form a synthesized position signal, i.e. synthesized amplitude of the MEMS scanning mirror. The synthesized amplitude has a stable value A', which represents that the MEMS scanning mirror stably swings. Therefore, if the two-stage rising manner is used to generate the required periodic wave signal in the same manner, the oscillation problem of the MEMS scanning mirror is resolved to generate a stable synthesized position signal.

Figure 5:
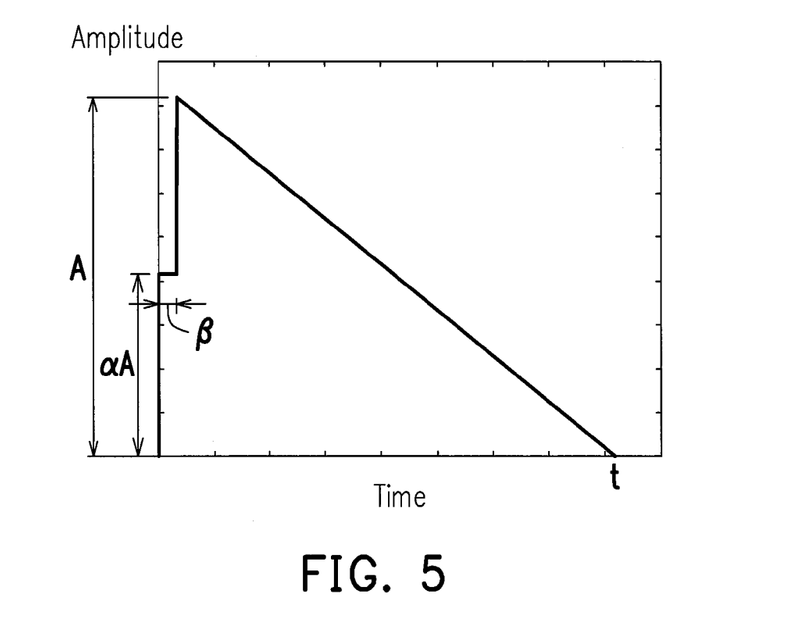
FIG. 5 is a schematic diagram of a periodic wave signal according to an embodiment of the invention.

FIG. 5 is a schematic diagram of a periodic wave signal according to an embodiment of the invention. Referring to FIG. 5, the periodic wave signal has amplitude A and a period t, and when the level of the periodic wave signal rises, the two-stage rising manner is used. In detail, during a period that the level of the periodic wave signal rises from the trough to the peak, when the level of the periodic wave signal rises to a first amplitude scale $\alpha A$, the level of the periodic wave signal is maintained to the first amplitude scale $\alpha A$ within a first maintaining period $\beta$. Then, the level of the periodic wave signal rises to the amplitude A. The first amplitude scale $\alpha A$ is a multiplication of the amplitude A and a first ratio coefficient $\alpha$. A relationship between the damping coefficient and the first ratio coefficient $\alpha$ is deduced below according to a response formula of a two-stage system:

$$\alpha = \frac{1}{1 + e^{\frac{-\pi\zeta}{\sqrt{1-\zeta^2}}}} \quad (1)$$

Where, $\zeta$ is the damping coefficient. Moreover, the first maintaining period $\beta$ is a half of a reciprocal of the resonance frequency. For example, if the resonance frequency of the MEMS scanning mirror is 720 Hz and the damping coefficient is 0.005, the calculated first ratio coefficient is 0.492146, the first amplitude scale is 0.492146 A and the first maintaining period is about 0.69 ms.

In the image projection method, the first amplitude scale, the first maintaining period and the periodic wave signal obtained according to the aforementioned steps are only calculated values, and the MEMS scanning mirror may still have the problem of uneven swing speed, which may cause the bright line problem when the image light beam scans on the projection plane along the first direction. Therefore, the image projection method further provides a method for correcting the periodic wave signal.

Figure 6:
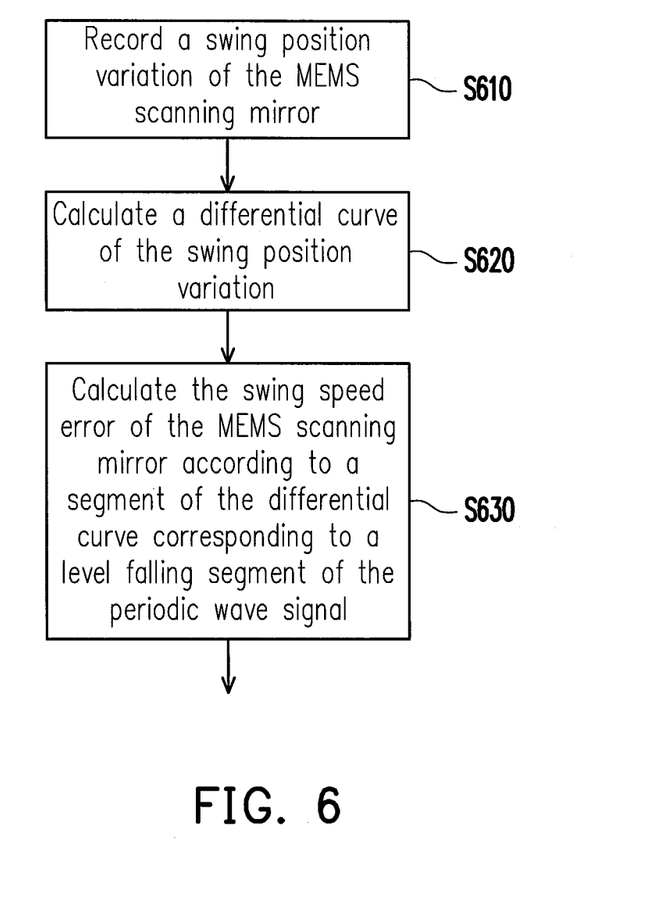
FIG. 6 is a flowchart illustrating a method for recording a swing speed error according to an embodiment of the invention.

After the periodic wave signal is generated, in step S140, the periodic wave signal is input to the MEMS scanning mirror to control the MEMS scanning mirror to swing, and the swing speed error of the MEMS scanning mirror is recorded. In detail, the method of recording the swing speed error includes following steps. FIG. 6 is a flowchart illustrating a method for recording the swing speed error according to an embodiment of the invention. Referring to FIG. 6, in step S610, a swing position variation of the MEMS scanning mirror is first recorded. Then, in step S620, a differential curve of the swing position variation is calculated. Finally, in step S630, the swing speed error of the MEMS scanning mirror is calculated according to a segment of the differential curve corresponding to a level falling segment of the periodic wave signal. It should be noticed that before the periodic wave signal is input to the MEMS scanning mirror, the periodic wave signal is first filtered to filter noise.

Figure 7A:
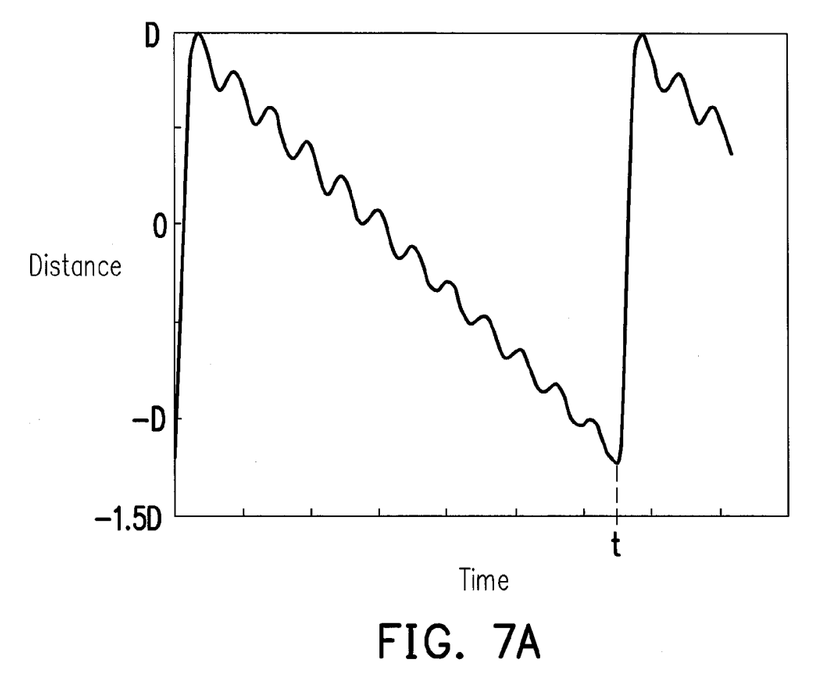
FIG. 7A and FIG. 7B are schematic diagrams of calculating a swing speed error according to an embodiment of the invention.
Figure 7B:
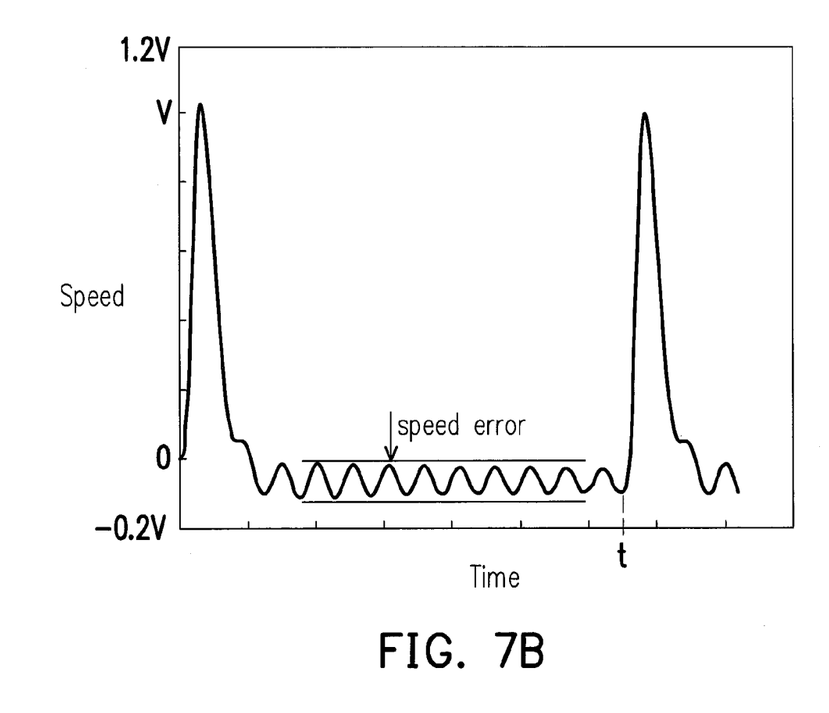

FIG. 7A and FIG. 7B are schematic diagrams of calculating a swing speed error according to an embodiment of the invention. Referring to FIG. 7A, since the MEMS scanning mirror is controlled by the periodic wave signal, the curve of the swing position variation has a waveform similar to that of the corresponding input periodic wave signal. In other words, within a period t, a variation segment of the swing position in distance (a unit distance is, for example, D) is similar to the waveform of the periodic wave signal. By differentiating the curve of the swing position variation of FIG. 7A, the swing speed (a unit speed is, for example, V) of the MEMS scanning mirror shown in FIG. 7B is obtained. When the image light beam is projected on the projection plane along the first direction, the swing speed of the MEMS scanning mirror is required to be consistent or have less variation, so as to provide stable projection quality. Regarding the curve of the swing position variation, the level falling segment represents the position variation of the MEMS scanning mirror, which projects the image light beam on the projection plane along the first direction. Ideally, after the periodic wave signal is input, when the level of the curve of the swing position variation falls, it forms a smooth oblique line, which represents that the MEMS scanning mirror smoothly swings without oscillation. However, the calculated and input periodic wave signal is not necessarily an ideal periodic wave signal. In FIG. 7A, regarding the curve of the swing position variation, the level falling segment has uneven up and down variations, so the corresponding swing speeds, shown in FIG. 7B, are not a uniform swing speed and have the swing speed error.

After the swing speed error is recorded, in step S150, the first amplitude scale and the first maintaining period are adjusted, and similar to the step S140, the corresponding swing speed error is recorded. It should be noticed that, steps S140 and S150 may be performed for several times, and a plurality of swing speed errors are recorded for generating the corrected periodic wave signal. Then, in the step S160, the corrected periodic wave signal is generated according to the at least one recorded swing speed error and the corresponding first amplitude scale and the first maintaining period.

In detail, according to the recorded swing speed error and the corresponding first ratio coefficient (the first amplitude scale) and the first maintaining period, when the swing speed error is the minimum, the corresponding first amplitude scale and the first maintaining period can be calculated by using a quadratic approximation method. In other words, when the first amplitude scale and the first maintaining period are respectively adjusted, the swing speed error correspondingly changes. According to a plurality of swing speed errors and the corresponding first ratio coefficients (first amplitude scales) and the first maintaining periods, a functional relationship between the swing speed error, the first ratio coefficients (first amplitude scale) and the first maintaining period is deduced, so that when the swing speed error is the minimum, the corresponding first ratio coefficient (first amplitude scale) and the first maintaining period are calculated by using the quadratic approximation method. The periodic wave signal generated by using the first ratio coefficient (first amplitude scale) and the first maintaining period is the corrected periodic wave signal.

Figure 8:
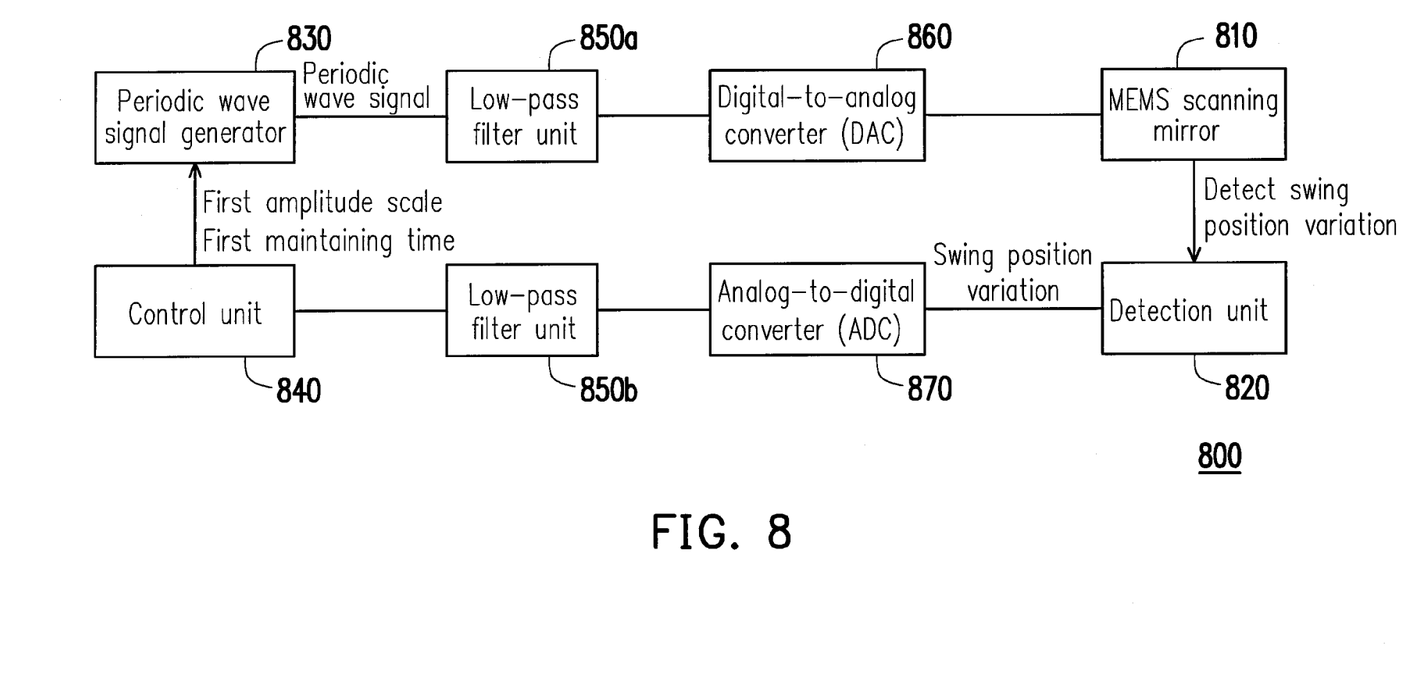
FIG. 8 is a schematic diagram of a microelectromechanical system (MEMS) image projection apparatus according to an embodiment of the invention.

The invention further provides a MEMS image projection apparatus, which uses the aforementioned image projection method to project the image light beam on projection plane along the first direction. FIG. 8 is a schematic diagram of a MEMS image projection apparatus according to an embodiment of the invention. Referring to FIG. 8, the MEMS image projection apparatus 800 includes a MEMS scanning mirror 810, a detection unit 820, a periodic wave signal generator 830 and a control unit 840. The MEMS scanning mirror 810 is capable of swinging in a three-dimensional (3D) space, and the MEMS scanning mirror 810 has a resonance frequency and a damping coefficient when swinging around a first swing axis. The resonance frequency and the damping coefficient can be learned during system identification or can be measured by the detection unit 820. The MEMS image projection apparatus 800 is further capable of projecting the image light beam on the projection plane 10 (FIG. 2) along the second direction.

Moreover, the detection unit 820 detects a swing position variation of the MEMS scanning mirror 810. The detection unit 820 may include a position sensing device, which records the swing position variation of the MEMS scanning mirror 810 through piezoelectric sensing or capacitive sensing.

The periodic wave signal generator 830 is coupled to the MEMS scanning mirror 810, and the periodic wave signal generator 830 outputs a periodic wave signal having a first frequency to the MEMS scanning mirror 810 according to a first amplitude scale and a first maintaining period, so as to control the MEMS scanning mirror 810 to swing around the first swing axis according to the first frequency, and accordingly project an image light beam on the projection plane 10 (FIG. 2) along the first direction. Moreover, by inputting other control signal, the MEMS scanning mirror 810 can further swing around a second swing axis, and the MEMS scanning mirror 810 projects the image light beam on the projection plane 10 (FIG. 2) along the second direction.

The control unit 840 is coupled to the periodic wave signal generator 830 and the detection unit 820. The control unit 840 calculates the first amplitude scale and the first maintaining period according to the resonance frequency and the damping coefficient, and controls the periodic wave signal generator 830 to output the periodic wave signal. Moreover, the control unit 840 calculates a swing speed error of the MEMS scanning mirror 810 according to the swing position variation of the MEMS scanning mirror 810. Moreover, the control unit 840 adjusts the first amplitude scale and the first maintaining period and records the corresponding swing speed error. The control unit 840 controls the periodic wave signal generator 830 to output a corrected periodic wave signal according to the recorded swing speed errors, so as to control the MEMS scanning mirror 810 to swing.

Referring to FIG. 8, the MEMS image projection apparatus 800 further includes a low-pass filter unit 850a and a digital-to-analog converter (DAC) 860. The low-pass filter unit 850a is coupled between the periodic wave signal generator 830 and the MEMS scanning mirror 810, and filters the periodic wave signal to remove noise. The DAC 860 is coupled between the low-pass filter unit 850a and the MEMS scanning mirror 810, and converts the periodic wave signal into an analog control signal (i.e. the periodic wave signal with an analog format) to control the MEMS scanning mirror 810.

Moreover, the MEMS image projection apparatus 800 may further include a low-pass filter unit 850b and an analog-to-digital converter (ADC) 870. The low-pass filter unit 850b is coupled between the control unit 840 and the detection unit 820, and filters the signal of swing position variation detected by the detection unit 820. The ADC 870 is coupled between the low-pass filter unit 850b and the detection unit 820, and converts the signal of swing position variation detected by the detection unit 820 from the analog format into a digital format.

The other features and details of applied projection technique of MEMS image projection apparatus 800 can be deduced from the aforementioned image projection method, which are not repeated.

In summary, according to the embodiments of the invention, in the image projection method, the resonance frequency and the damping coefficient of the MEMS scanning mirror swinging around the first swing axis are first detected, and the first ratio coefficient, the first amplitude scale and the first maintaining period are calculated to generate the periodic wave signal. Moreover, by inputting the periodic wave signal to the MEMS scanning mirror for observing the motion of the MEMS scanning mirror and adjusting the periodic wave signal, the corrected periodic wave signal is generated. According to the corrected periodic wave signal, the MEMS scanning mirror can scan the projection plane to form a projected image by a required frequency and speed, so as to avoid generation of the bright line that influences the projection quality. Moreover, the invention also provides a MEMS image projection apparatus, which applies the aforementioned image projection method to maintain the image quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image projection method for controlling a microelectromechanical system (MEMS) scanning mirror to swing around a first swing axis in order to project an image light beam on a projection plane along a first direction, the image projection method comprising:

measuring a resonance frequency and a damping coefficient of the MEMS scanning mirror swinging around the first swing axis;

calculating a first amplitude scale and a first maintaining period according to the resonance frequency and the damping coefficient, wherein the first amplitude scale is calculated by following equation:

$$\alpha = \frac{1}{1 + e^{\frac{-\pi\zeta}{\sqrt{1-\zeta^2}}}}$$

where, $\alpha$ is a first ratio coefficient, $\zeta$ is a damping coefficient, and the first amplitude scale is a multiplication of the first ratio coefficient and an amplitude of the periodic wave signal;

generating a periodic wave signal, wherein each time when a level of the periodic wave signal rises to the first amplitude scale, during the first maintaining period, the level of the periodic wave signal is maintained at the first amplitude scale;

inputting the periodic wave signal to the MEMS scanning mirror to control the MEMS scanning mirror to swing, and recording a swing speed error of the MEMS scanning mirror;

adjusting the first amplitude scale and the first maintaining period to change the periodic wave signal, and recording the corresponding swing speed error; and generating a corrected periodic wave signal to control the MEMS scanning mirror to swing according to the recorded swing speed error.

2. The image projection method as claimed in claim 1, wherein the first maintaining period is a half of a reciprocal of the resonance frequency.

3. The image projection method as claimed in claim 1, wherein the periodic wave signal is a triangular wave signal, a time for a level of the triangular wave signal rising from a trough to a peak is less than a time for the level of the triangular wave signal falling from the peak to the trough.

4. An image projection method for controlling a microelectromechanical system (MEMS) scanning mirror to swing around a first swing axis in order to project an image light beam on a projection plane along a first direction, the image projection method comprising:

measuring a resonance frequency and a damping coefficient of the MEMS scanning mirror swinging around the first swing axis;

calculating a first amplitude scale and a first maintaining period according to the resonance frequency and the damping coefficient;

generating a periodic wave signal, wherein each time when a level of the periodic wave signal rises to the first amplitude scale, during the first maintaining period, the level of the periodic wave signal is maintained at the first amplitude scale;

inputting the periodic wave signal to the MEMS scanning mirror to control the MEMS scanning mirror to swing, and recording a swing speed error of the MEMS scanning mirror;

adjusting the first amplitude scale and the first maintaining period to change the periodic wave signal, and recording the corresponding swing speed error; and generating a corrected periodic wave signal to control the MEMS scanning mirror to swing according to the recorded swing speed error, wherein the step of recording the swing speed error of the MEMS scanning mirror comprises:

recording a swing position variation of the MEMS scanning mirror;

calculating a differential curve of the swing position variation; and calculating the swing speed error of the MEMS scanning mirror according to a segment of the differential curve corresponding to a level falling segment of the periodic wave signal.

5. An image projection method for controlling a microelectromechanical system (MEMS) scanning mirror to swing around a first swing axis in order to project an image light beam on a projection plane along a first direction, the image projection method comprising:

measuring a resonance frequency and a damping coefficient of the MEMS scanning mirror swinging around the first swing axis;

calculating a first amplitude scale and a first maintaining period according to the resonance frequency and the damping coefficient;

generating a periodic wave signal, wherein each time when a level of the periodic wave signal rises to the first amplitude scale, during the first maintaining period, the level of the periodic wave signal is maintained at the first amplitude scale;

inputting the periodic wave signal to the MEMS scanning mirror to control the MEMS scanning mirror to swing, and recording a swing speed error of the MEMS scanning mirror;

adjusting the first amplitude scale and the first maintaining period to change the periodic wave signal, and recording the corresponding swing speed error; and generating a corrected periodic wave signal to control the MEMS scanning mirror to swing according to the recorded swing speed error comprising:

calculating the first amplitude scale and the first maintaining period according to a quadratic approximation method when the swing speed error is the minimum; and generating the corrected periodic wave signal according to the corresponding first amplitude scale and the first maintaining period.

6. The image projection method as claimed in claim 1, wherein the step of generating the periodic wave signal comprises:

performing a filtering processing to the periodic wave signal to filter noise.

7. The image projection method as claimed in claim 1, wherein the MEMS scanning mirror further swings around a second swing axis, and projects the image light beam on the projection plane along a second direction.

8. A microelectromechanical system (MEMS) image projection apparatus for applying an image projection method to project an image light beam on a projection plane along a first direction, the MEMS image projection apparatus comprising:

a MEMS scanning mirror, having a resonance frequency and a damping coefficient when swinging around a first swing axis;

a detection unit, detecting a swing position variation of the MEMS scanning mirror;

a periodic wave signal generator, coupled to the MEMS scanning mirror, for outputting a periodic wave signal having a first frequency to the MEMS scanning mirror according to a first amplitude scale and a first maintaining period, so as to control the MEMS scanning mirror to swing around the first swing axis according to the first frequency, and accordingly project an image light beam on the projection plane along the first direction; and a control unit, coupled to the periodic wave signal generator and the detection unit, for calculating the first amplitude scale and the first maintaining period according to the resonance frequency and the damping coefficient, and controlling the periodic wave signal generator to output the periodic wave signal, wherein the control unit calculates the first amplitude scale by following equation:

$$\alpha = \frac{1}{1 + e^{\frac{-\pi\zeta}{\sqrt{1-\zeta^2}}}}$$

where, $\alpha$ is a first ratio coefficient, $\zeta$ is a damping coefficient, and the first amplitude scale is a multiplication of the first ratio coefficient and an amplitude of the periodic wave signal, wherein the control unit calculates a swing speed error of the MEMS scanning mirror according to the swing position variation of the MEMS scanning mirror, the control unit adjusts the first amplitude scale and the first maintaining period and records the corresponding swing speed error, the control unit controls the periodic wave signal generator to output a corrected periodic wave signal according to the recorded swing speed error, so as to control the MEMS scanning mirror to swing.

9. The MEMS image projection apparatus as claimed in claim 8, further comprising:

a low-pass filter unit, coupled between the periodic wave signal generator and the MEMS scanning mirror, and performing a filtering processing to the periodic wave signal to filter noise; and a digital-to-analog converter, coupled between the low-pass filter unit and the MEMS scanning mirror, and converting the periodic wave signal into an analog control signal.

10. The MEMS image projection apparatus as claimed in claim 8, wherein the first maintaining period is a half of a reciprocal of the resonance frequency.

11. The MEMS image projection apparatus as claimed in claim 8, wherein the periodic wave signal is a triangular wave signal, a time for a level of the triangular wave signal rising from a trough to a peak is less than a time for the level of the triangular wave signal falling from the peak to the trough.

12. The MEMS image projection apparatus as claimed in claim 8, wherein the detection unit comprises a position sensing device, and the position sensing device records the swing position variation of the MEMS scanning mirror through piezoelectric sensing or capacitive sensing.

13. A microelectromechanical system (MEMS) image projection apparatus for applying an image projection method to project an image light beam on a projection plane along a first direction, the MEMS image projection apparatus comprising:

a MEMS scanning mirror, having a resonance frequency and a damping coefficient when swinging around a first swing axis;

a detection unit, detecting a swing position variation of the MEMS scanning mirror;

a periodic wave signal generator, coupled to the MEMS scanning mirror, for outputting a periodic wave signal having a first frequency to the MEMS scanning mirror according to a first amplitude scale and a first maintaining period, so as to control the MEMS scanning mirror to swing around the first swing axis according to the first frequency, and accordingly project an image light beam on the projection plane along the first direction; and a control unit, coupled to the periodic wave signal generator and the detection unit for calculating the first amplitude scale and the first maintaining period according to the resonance frequency and the damping coefficient, and controlling the periodic wave signal generator to output the periodic wave signal, wherein the control unit calculates a swing speed error of the MEMS scanning mirror according to the swing position variation of the MEMS scanning mirror, the control unit adjusts the first amplitude scale and the first maintaining period and records the corresponding swing speed error, the control unit controls the periodic wave signal generator to output a corrected periodic wave signal according to the recorded swing speed error, so as to control the MEMS scanning mirror to swing, wherein the control unit calculates a differential curve of the swing position variation, and calculates the swing speed error of the MEMS scanning mirror according to a segment of the differential curve corresponding to a level falling segment of the periodic wave signal.

14. A microelectromechanical system (MEMS) image projection apparatus for applying an image projection method to project an image light beam on a projection plane along a first direction, the MEMS image projection apparatus comprising:

a MEMS scanning mirror, having a resonance frequency and a damping coefficient when swinging around a first swing axis;

a detection unit, detecting a swing position variation of the MEMS scanning mirror;

a periodic wave signal generator, coupled to the MEMS scanning mirror, for outputting a periodic wave signal having a first frequency to the MEMS scanning mirror according to a first amplitude scale and a first maintaining period, so as to control the MEMS scanning mirror to swing around the first swing axis according to the first frequency, and accordingly project an image light beam on the projection plane along the first direction; and a control unit, coupled to the periodic wave signal generator and the detection unit, for calculating the first amplitude scale and the first maintaining period according to the resonance frequency and the damping coefficient, and controlling the periodic wave signal generator to output the periodic wave signal, wherein the control unit calculates a swing speed error of the MEMS scanning mirror according to the swing position variation of the MEMS scanning mirror, the control unit adjusts the first amplitude scale and the first maintaining period and records the corresponding swing speed error, the control unit controls the periodic wave signal generator to output a corrected periodic wave signal according to the recorded swing speed error, so as to control the MEMS scanning mirror to swing, wherein the control unit calculates the corresponding first amplitude scale and the first maintaining period according to a quadratic approximation method when the swing speed error is the minimum by using the recorded swing speed error, so as to control the periodic wave signal generator to generate the corrected periodic wave signal.

15. The MEMS image projection apparatus as claimed in claim 8, wherein the MEMS scanning mirror further swings around a second swing axis, and projects the image light beam on the projection plane along a second direction.

* * * * *